H. R. GILSON.
MECHANISM FOR MAKING ARMORED CABLE.
APPLICATION FILED AUG. 14, 1911.
1,127,616.
Patented Feb. 9, 1915.
3 SHEETS—SHEET 1.
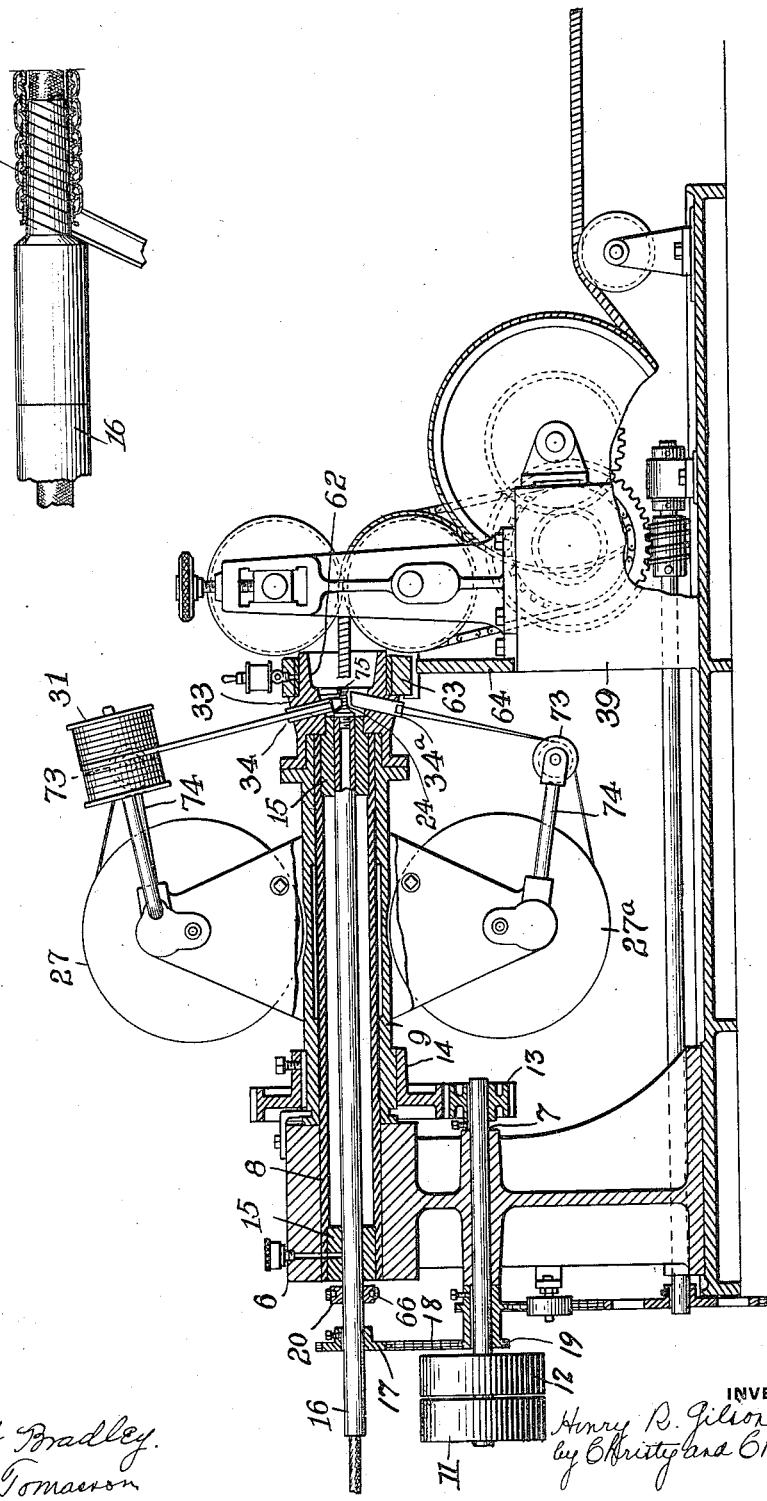
WITNESSES:
J. Herbert Bradley.
Francis J. Tomasson
INVENTOR
Henry R. Gilson,
by Christy and Christy
Atty's H. R. GILSON.
MECHANISM FOR MAKING ARMORED CABLE.
APPLICATION FILED AUG. 14, 1911.
1,127,616.
Patented Feb. 9, 1915.
3 SHEETS—SHEET 2.
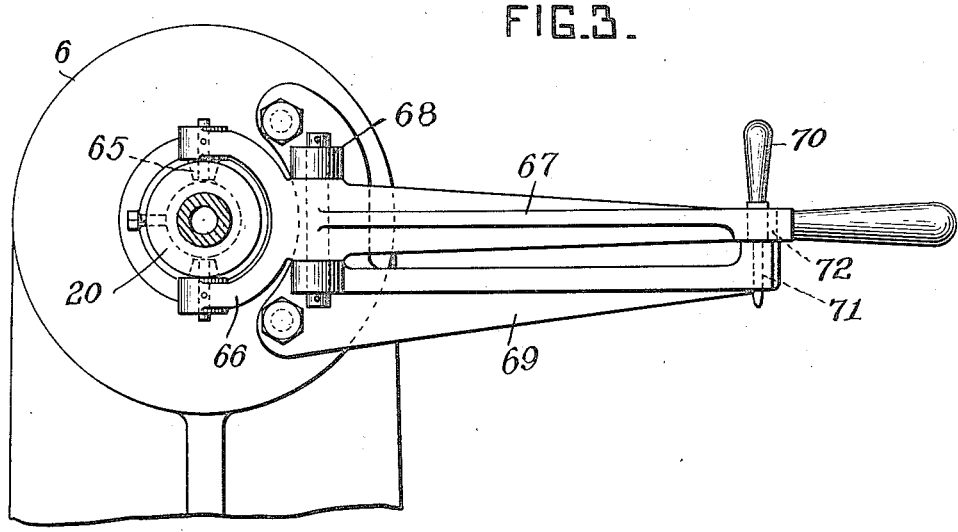
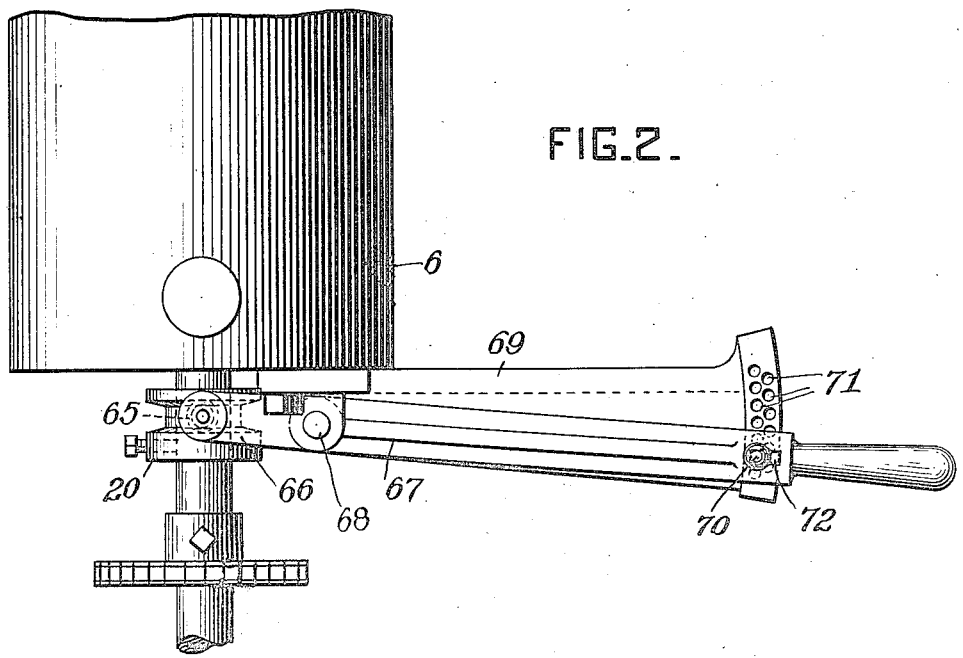

H. R. GILSON.
MECHANISM FOR MAKING ARMORED CABLE.
APPLICATION FILED AUG. 14, 1911.
1,127,616.
Patented Feb. 9, 1915.
3 SHEETS—SHEET 3.
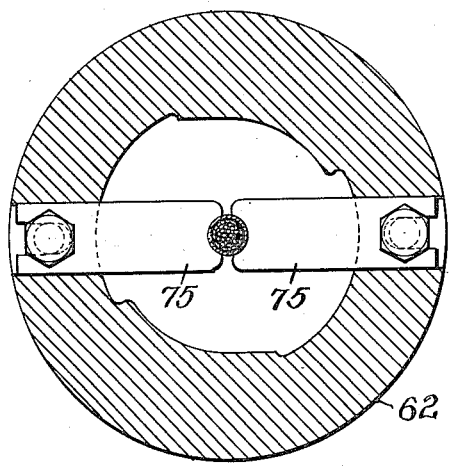
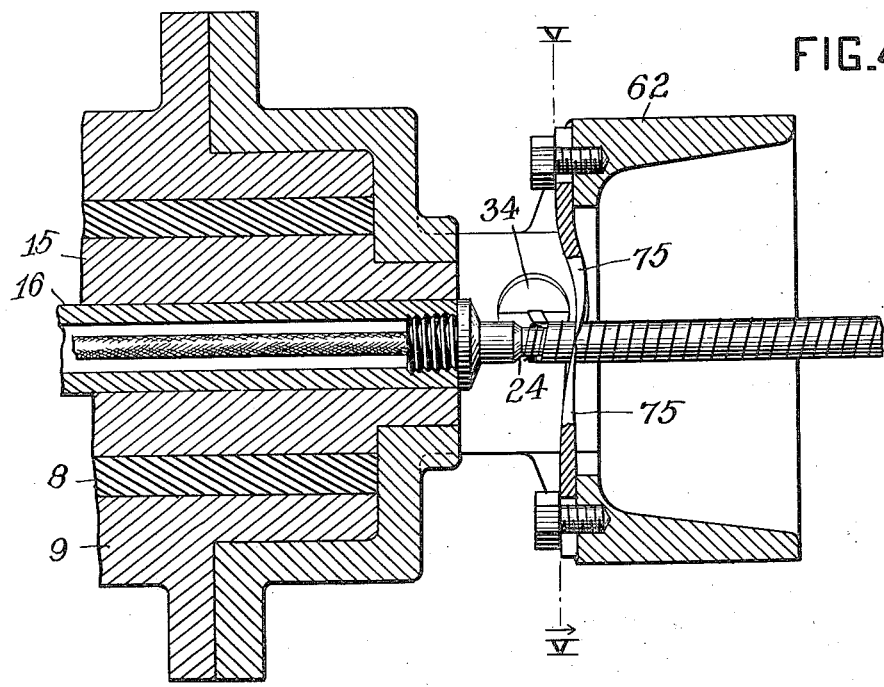
WITNESSES:
J. Herbert Bradley.
Francis J. Tomasson
INVENTOR
Henry R. Gilson,
by Christy and Christy
Att'ys

UNITED STATES PATENT OFFICE.

HENRY R. GILSON, OF BEAVER, PENNSYLVANIA, ASSIGNOR TO NATIONAL METAL MOLDING COMPANY, A CORPORATION OF PENNSYLVANIA.

MECHANISM FOR MAKING ARMORED CABLE.

1,127,616. Specification of Letters Patent. Patented Feb. 9, 1915.

Application filed August 14, 1911. Serial No. 643,934.

*To all whom it may concern:*

Be it known that I, HENRY R. GILSON, residing at Beaver, in the county of Beaver and State of Pennsylvania, a citizen of the United States, have invented or discovered certain new and useful Improvements in Mechanism for Making Armored Cable, of which improvements the following is a specification.

The invention consists in certain improvements upon the machine shown and described in Letters Patent No. 1,004,643, dated October 3rd, 1911, and has for its object the rendering of the machine more efficient, and the improvement of the product.

In the accompanying drawings Figure 1 is a side elevation of the machine. partly in section. Figs. 2 and 3 are detail views on an enlarged scale, in plan and in rear elevation respectively, showing the means for adjusting the mandrel. Fig. 4 is a detail sectional view, showing the spacing fingers. Fig. 5 is a cross-section on the line V—V of Fig. 4, looking in the direction of the arrows, and Fig. 6 is an enlarged view of the mandrel in elevation and the strips in section as applied to the cable.

The general construction and operation of the present machine are the same as particularly shown and described in the Letters Patent above referred to. It is provided with the fixed bearing-shaft 8, upon which is mounted the rotating sleeve 9, carrying the reels 27 and 27ª for the inner and outer strips respectively, and coiling-head 33 and guides or feeding means 34 and 34ª. The mandrel-shaft 16 is mounted in the bushings 15, and is rotated in the direction opposite to that of the rotation of the sleeve 9.

The mandrel-shaft 16 and sleeve 9 are b th rotated by the main driving-shaft 7, which is provided with the fast and loose pulleys 11 and 12. The sprocket 19 on shaft 7 is connected by chain 18 with the sprocket 17 on the mandrel-shaft 16, and the pinion 13 on shaft 7 meshes with the large pinion 14 on the sleeve 9. Thus the mandrel-shaft 16 and the mandrel 24 are rotated in the direction opposite to that of the rotation of the sleeve 9, (which latter carries the reels, coiling-head and guides for the strips), and at a higher speed. The mandrel, coiling-head and reels coöperate in the manner described at length in the said Letters Patent to coil the strips helically upon the cable and to feed the armored cable continuously forward. In this case only two reels are shown, since a "two-strip" armor or conduit is formed instead of the "four-strip" variety formerly described.

In order to give greater rigidity to the coiling-head it is provided with a hollow extension 62, fitting in the bearing 63 on the upper end of standard 64, supported on the block 39.

The metallic strips used for making the armor have been found to vary in their elasticity, due to the unavoidable variation in cold-rolling and annealing temperatures. Not only do the strips forming different reels differ in elasticity, but it frequently happens that the elasticity will vary in different portions of a single reel, part of the strip being stiff and springy and part being soft and easily bent.

In winding a strip on the large diameter of a tapered mandrel, it has been found that, when the strip is soft and well-annealed, it will follow down the tapered surface of the mandrel gripping it very closely and on coming off will draw down easily and snugly upon the wire, thereby bringing the outside diameter of the finished armored cable to a uniform minimum without excess pressure being required by the sizing rolls. In winding the stiffer portions of the strip upon the mandrel at the same point the soft portions were wound, it has been found that the coils will not draw down closely around the mandrel, and on coming off they will not grip the wire snugly, but require an excess pressure from the sizing rolls. This produces a product stiff and hard to handle. In other words in the finished product the coils of armor formed of relatively stiff metal maintain very nearly the same diameter as the point of the mandrel upon which they are first coiled, whereas the diameter of the coils formed of soft metal is less than the diameter of the mandrel at the point at which they are formed.

In order to compensate for the difference in elasticity of the strip, and thus obtain a constant diameter armor without excess pressure being required of the sizing rolls, I gradually taper the mandrel and provide means for effecting a longitudinal movement thereof with relation to the point at which the strip is fed to it. By such an arrangement the softer strip or portions thereof may be fed to the larger diameter portion of the mandrel, and the hard or stiff strip may be fed to the smaller portion thereof, the result being that a uniform diameter armor will be formed.

Were the soft portions of the strip fed on to the smaller portions of the mandrel, the drawing down of the coils would be much greater than that in the case of the stiff strip so that these coils would embed themselves too deeply into the insulated covering of the wire. Furthermore, in order to lose no time in the operation of the machine so that a workman may watch the effect of the mandrel adjustment upon the diameter of the armor, the means of adjustment are of such a character as to render them capable of operation while the machine is running.

Referring to the illustrative embodiment of my invention, the general construction of the tapered mandrel 24, and the manner of coiling the strips therein, is best seen in Fig. 6 and the mandrel shaft adjusting means are particularly shown in Figs. 2 and 3. The rear end of the mandrel-shaft has fixed thereto the grooved collar 20, within which lie the rollers 65, rotatably attached to the arms 66 of a lever 67, pivoted at 68 to the bracket 69, which is bolted to the rear face of the block 6. The lever 67 carries at its outer end a loose pin 70, adapted to fit in holes 71 in the end of the bracket 69, and thus lock the mandrel-shaft and mandrel in the adjusted position. There are preferably two rows of the holes 71, and the shank of the pin 70 is squared and is fitted in the slot 72 in the lever, so that the pin may be placed in any hole in either row.

A guide 73, which may be simply a round bar, is provided for each of the metallic strips, and is suitably supported by the coiling-frame, as by arms 74. A reel 31 for a filling-strip is also shown as carried by the coiling-frame.

In order to secure exact uniformity in the product, spacing fingers 75 are provided, which may be bolted to the rear face of the extension 62 of the coiling-head, as shown in Figs. 4 and 5. The inner tips of these fingers lie at diametrically opposite points, and are separated in longitudinal direction to suit the pitch of the coils, so that they act to insure uniform spacing of the successive coils of the outer strip.

Since the present machine is otherwise substantially the same as that shown and described in said Letters Patent, further description is believed to be unnecessary. It will be obvious however that the improvements herein described are capable of use in machines of other types.

I claim herein as my invention:

1. In a machine for making armored cable, the combination of a gradually tapered mandrel, means for coiling a metallic strip on the tapered portion thereof, means for adjusting the mandrel longitudinally and with relation to the position of the strip fed thereon, whereby the diameter of the armor being formed may be held constant regardless of variation in the flexibility of the strip, and means for securing the mandrel in adjusted position.

2. In a machine for making armored cable, the combination of a gradually tapered mandrel, means for coiling a metallic strip upon the tapered portion thereof and upon a cable, means for adjusting the mandred longitudinally and with relation to the position of the strip fed thereon, whereby the diameter of the armor being formed may be maintained constant regardless of variations in the flexibility of the strip, said adjusting means being capable of operation while the machine is running, and means for securing the mandrel in adjusted position.

3. In a machine for making armored cable, the combination of a rotatable mandrel shaft provided on its ends with a gradually tapered mandrel, means for coiling a metallic strip upon the tapered portion thereof and upon a cable, a pivoted lever adapted to engage said shaft for effecting an adjustment thereof, and means for securing said lever in a plurality of shaft-adjustment positions.

4. In a machine for making armored cable, the combination of a gradually tapered mandrel, means for feeding and coiling a metallic strip on the tapered portion thereof, and means for effecting a relative adjustment between said mandrel and the means for feeding the strip thereon, whereby the strip may be coiled upon points of the mandrel having different diameters.

In testimony whereof I have hereunto set my hand.

HENRY R. GILSON.

Witnesses:
WILLIAM C. ROBINSON,
MARSHALL A. CHRISTY.